United States Patent

Kang

[11] Patent Number: 5,962,157
[45] Date of Patent: Oct. 5, 1999

[54] INTELLIGENT BATTERY DEVICE

[75] Inventor: Jae-Ho Kang, Kyungki-do, Rep. of Korea

[73] Assignee: Samsung Display Devices Co., Ltd., Rep. of Korea

[21] Appl. No.: 08/893,957

[22] Filed: Jul. 15, 1997

[30] Foreign Application Priority Data

Jul. 16, 1996 [KR] Rep. of Korea ............... 96-28691

[51] Int. Cl.$^6$ ............................................. H01M 10/48
[52] U.S. Cl. ............................................. 429/62; 429/92
[58] Field of Search ............................. 429/7, 61, 62, 429/90, 92

[56] References Cited

U.S. PATENT DOCUMENTS

| | | | |
|---|---|---|---|
| 5,200,686 | 4/1993 | Lee | 429/7 X |
| 5,462,814 | 10/1995 | Fernandez et al. | 429/7 X |
| 5,594,319 | 1/1997 | Thandiwe | 429/7 |
| 5,795,664 | 8/1998 | Kelly | 429/7 |

*Primary Examiner*—Stephen Kalafut
*Attorney, Agent, or Firm*—Christie, Parker & Hale, LLP

[57] ABSTRACT

An intelligent battery device comprises the battery pack and the battery management device. The battery pack includes a battery group which is chargeable and dischargeable and a thermistor which detects and outputs the temperature of the battery group. The battery management unit, after receiving power and temperature signal from the battery pack between the battery pack and a host equipment, transfers power and information about the remaining capacity and deterioration of the battery to the host equipment and then transfers power supplied from the host equipment to the battery pack. The separation of the battery pack and the battery management unit allows the users to avoid malfunction of the battery management unit and damage to the circuit substrate when the battery group leaks liquid from the inner part and overheats in a hot and humid climate, and to change only the battery pack without touching the battery management unit when the user would like to change the battery group, to thereby reduce the burden of the user.

5 Claims, 3 Drawing Sheets

INTELLIGENT BATTERY DEVICE

BACKGROUND OF THE INVENTION (a) Field of the Invention

This invention relates generally to an intelligent battery device and more particularly to an intelligent battery device where a battery pack and a battery management unit are formed, respectively.

(b) Description of the Related Art

A battery management unit is an interface between portable electronic equipment and a battery, used as a power supply. This unit has been developed for supplying information about the remaining capacity and deterioration of the battery to the portable electronic equipment, and for optimum charge control and removal of memory effect, so that the battery performance can be fully used.

An intelligent battery device, including a battery management unit and a battery as a power supply, measures the battery voltage, charge/discharge current, and battery temperature to detect the remaining capacity and control the charge. It also has a function for transferring battery and charge information through serial communication in response to the requirements from portable electronic equipment.

FIG. 1 is a schematic diagram showing the portable electronic equipment using a conventional intelligent battery device.

As shown in FIG. 1, the portable electronic equipment, having a conventional intelligent battery device therein, includes an adapter 1 and host equipment 5. The adapter I receives power from an external power supply and then outputs a constant voltage and current. The host equipment 5 operates by power from the adapter 1 or the intelligent battery device 3, and also outputs power from the adapter 1 to charge the intelligent battery device 3.

FIG. 2 is a block diagram, showing the conventional intelligent battery device. FIG. 3 is a perspective view of the device.

As shown in FIGS. 2 and 3, the intelligent battery device 3 of the portable electronic equipment, having the conventional battery device therein, comprises a battery group 7, a thermistor 9 and a battery management unit 11. The battery group is chargeable and dischargeable. The thermistor 9 measures the temperature of the battery group 7 and outputs the result. The battery management unit 11 supplies information about the remaining capacity and deterioration of the battery group 7 to the host equipment 5 and controls charge/discharge between the host equipment 5 and the battery group 7

Here, a battery pack, having the battery group 7, the thermistor 9 and the battery management unit 11 therein, is equipped within the portable electronic equipment.

The battery management unit 11 includes a charge/discharge unit 13 and a controller 15. The charge/discharge unit 13 provides a path of charge/discharge current between the host equipment 5 and the battery group 7, and outputs a voltage of the battery group 7 and a charge/discharge current. The controller 15 receives a voltage from the battery group 7, a charge/discharge current from the charge/discharge unit 13 and the temperature of the battery group 7 from the thermistor 9, and, detecting the remaining capacity and deterioration of the battery group 7, transfers this information to the host equipment 5, so that the controller 15 can control the charge/discharge unit 13.

If the adapter 1 doesn't supply power to the host equipment 5, it is operated by power from the battery group 7 connected to the battery management unit 11.

At this point, the charge/discharge unit 13 detects the voltage or current from the battery group 7 and then transfers the detected information to the controller 15. The controller 15 detects the remaining capacity of the battery group 7 by the transferred information and transfers the detected information to the host equipment 5, so that the user knows the remaining capacity.

Also, the thermistor 9 detects the temperature of the battery group 7 and then transfers the information to the controller 15, and the controller 15 detects information about the deterioration of the battery group 7 and then transfers this information to the host equipment 5.

If the remaining capacity of the battery group 7 is low, the battery group 7 is charged by the external power supplied through the adapter 1.

At this point, if the operation of the host equipment 5 is OFF, the output voltage from the adapter 1 is supplied to the battery group 7 via the host equipment 5 and the charge/discharge unit 13.

However, if the operation of the host equipment 5 is ON, the output voltage from the adapter 1 is supplied to the battery group 7 and the host equipment 5 simultaneously.

The controller 15 receives the current or voltage from the charge/discharge unit 13 and then controls the above-identified charge process.

However, according to the conventional art, because the battery management unit 11 and the battery group 7 is equipped within the battery pack 16, if liquid leaks from the battery group 7 due to a hot and humid climate and thereby damages the parts and circuit substrate within the battery pack 16, there is a possibility that the battery management unit 11 could malfunction wrong. operated, and also the battery pack 16, including the battery management unit 11, must be entirely replaced to change the battery group 7, to thereby increase the change cost.

SUMMARY OF THE INVENTION

It is, therefore, an object of the present invention to provide an intelligent battery device which has a battery management unit and a battery pack separately. The separation of the two units allows the users to avoid malfunction of the battery management unit and the damage of the circuit substrate when the battery group leaks liquid from the inner part and is overheats in a hot and humid climate, and to change only the battery pack without touching the battery management unit when the user would like to change the battery group, to thereby reduce the burden on the user.

To achieve these objects, the prevent invention comprises a battery pack and a battery management unit. The battery pack includes a battery group which is chargeable and dischargeable and a thermistor which detects and outputs the temperature of the battery group. The battery management unit, after receiving power and temperature signal from the battery pack, transfers power and information about the remaining capacity and deterioration of the battery to the host equipment and then transfers power supplied from the host equipment to the battery pack.

To further to achieve the above-identified objects, the present invention comprises a battery pack and a battery management unit. The battery pack includes a battery group, a thermistor and an information saving unit. The battery group is chargeable and dischargeable. A thermistor detects and outputs the temperature of the battery group. The information saving unit loads information about the battery group. The battery management unit, after receiving power, temperature signal and information about the battery group from the battery pack, transfers power and information about the remaining capacity and deterioration of the battery to the host equipment and then transfers power supplied from the host equipment to the battery pack.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein: rather, the embodiments are provided so that this disclosure will be thorough and complete, and will fully convey the scope of the invention to those skilled in the art.

Figure 1:
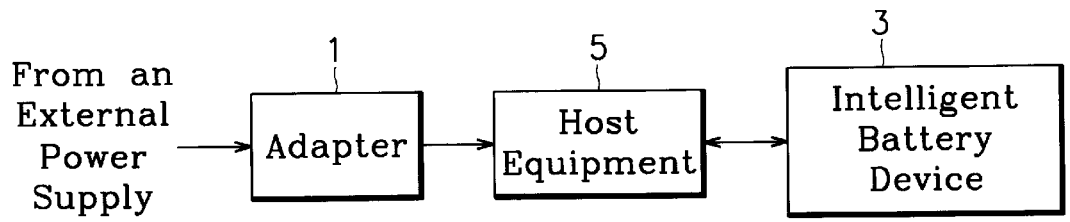
FIG. 1 is a schematic diagram illustrating portable electronic equipment using the conventional intelligent battery device.
Figure 2:
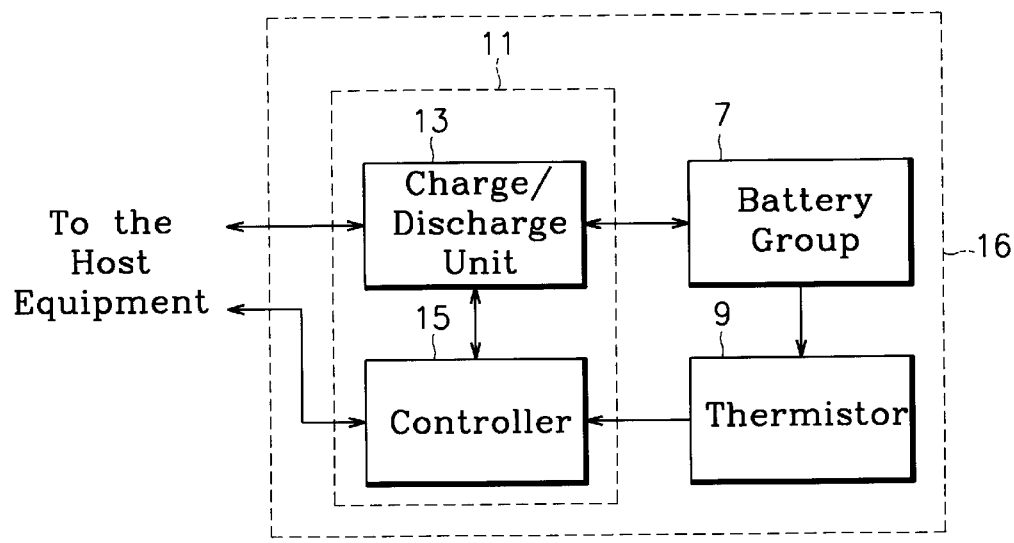
FIG. 2 is a block diagram illustrating an intelligent battery device of portable electronic equipment using the conventional intelligent battery device.
Figure 3:
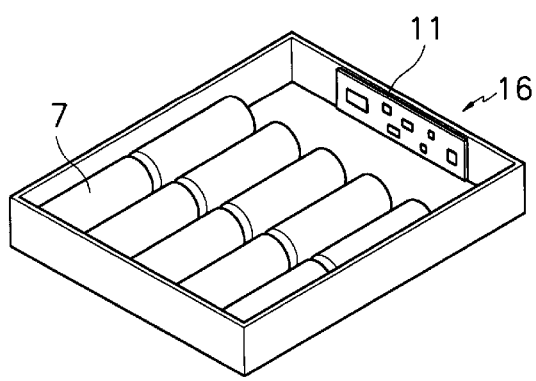
FIG. 3 is a perspective view illustrating an intelligent battery device of a portable electronic equipment using the conventional intelligent battery device.
Figure 4:
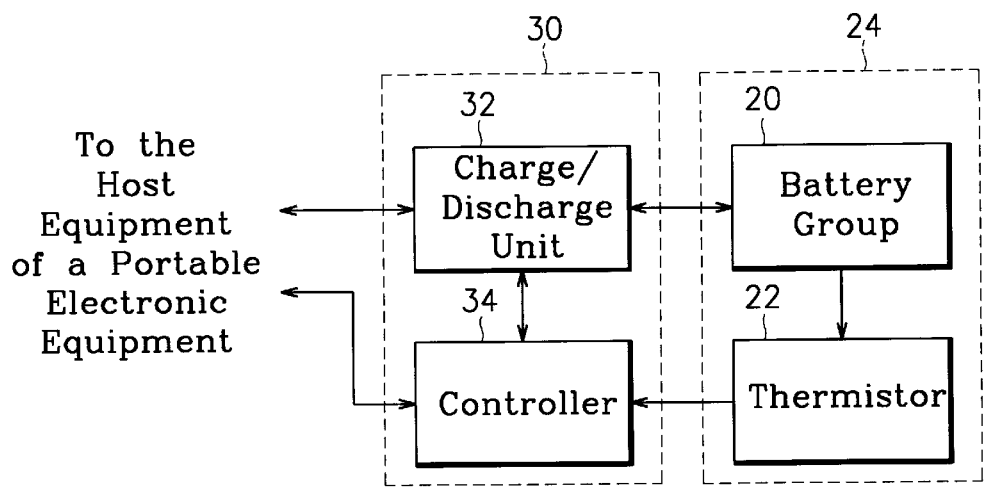
FIG. 4 is a block diagram illustrating an intelligent battery device according to the first embodiment of the present invention.
Figure 5:
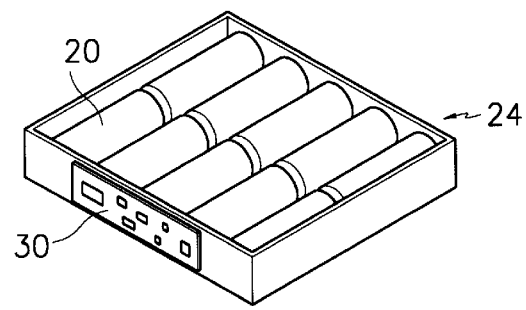
FIG. 5 is a perspective view illustrating an intelligent battery device according to the first embodiment of the present invention.

FIG. 4 is a block diagram illustrating an intelligent battery device according to the first embodiment of the present invention, and FIG. 5 is a perspective view of the device.

As shown in FIGS. 4 and 5, the intelligent battery device according to the first embodiment of the present invention comprises a battery pack 24 and a battery management unit 30. The battery pack 24 includes a battery group 20 which is chargeable and dischargeable and a thermistor 22 which measures the temperature of the battery group and outputs the result. The battery management unit 30 receives power and a temperature signal from the battery pack 24 and then supplies information about the remaining capacity and deterioration of the battery to the host equipment and also transfers power supplied from the host equipment to the battery pack 24.

The battery management unit 30 according to the first embodiment of the present invention includes the charge/discharge unit 32 and the controller 34. The charge/discharge unit 32 provides a path of charge/discharge current between the host equipment and the battery group 20 and outputs a voltage from the battery group 20 and a charge/discharge current. The controller 34, after receiving a voltage from the battery group 20, a charge/discharge current from the charge/discharge unit 32 and the temperature of the battery group 20 from the thermistor 22, detects the remaining capacity and deterioration of the battery group 20 to transfer this information to the host equipment, so that the controller 34 can control the charge/discharge unit 32.

The operation of the intelligent battery device according to the first embodiment is described as follows.

The host equipment is operated by power supplied through the charge/discharge unit 32 from the battery group 20.

At this point, the charge/discharge unit 32, after detecting the voltage or current from the battery group 20, transfers the detected information to the controller 34. The controller 15, after detecting the remaining capacity of the battery group 20 from the transferred information, transfers the detected information to the host equipment.

Also, the thermistor 22, after detecting the temperature of the battery group 20, transfers the information to the controller 34. The controller 34 after detecting information about the deterioration of the battery group 20, transfers this information to the host equipment.

If the remaining capacity of the battery group 20 is low, the battery group 20 is charged by power supplied through the charge/discharge unit 32 from the host equipment.

And, the controller 34 receives current or voltage from the charge/discharge unit 32, to thereby control the above-identified charge process.

Here, the battery management unit 30 and the battery pack 24 are separately formed within the host equipment, to thereby avoid malfunction of the battery management unit 30 and damage of the circuit substrate when a battery leaks liquid from the inner part and overheats due to a hot and humid climate.

However, because the user can replace only the battery pack 20 without touching the battery management unit 30, the battery management unit 30 can be used semi-permanently, to thereby reduce the burden to the user.

Figure 6:
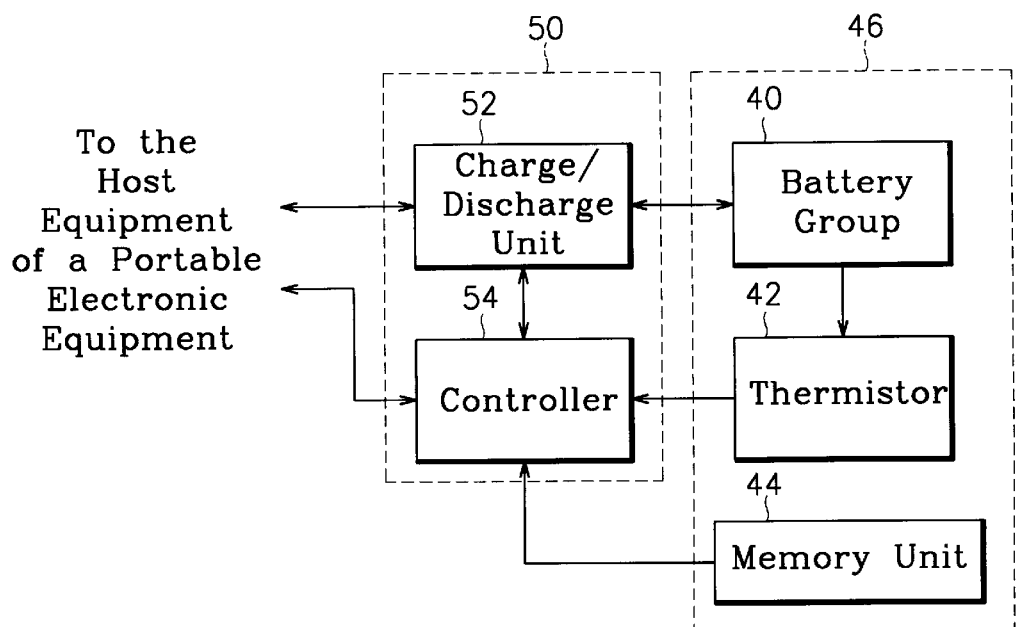
FIG. 6 is a block diagram illustrating an intelligent battery device according to the second embodiment of the present invention.

FIG. 6 is a block diagram illustrating the intelligent battery device according to the second embodiment of the prevent invention.

As shown in FIG. 6, the intelligent battery device according to the second embodiment of the present invention comprises a battery pack 46 and a battery management unit 50. The battery pack 46 includes a battery group 40 which is chargeable and dischargeable, a thermistor 42 which measures the temperature of the battery group 40 to output the result, and a memory 20 unit 44 which loads basic information about the battery group 40. The battery management unit 30, after receiving power and a temperature signal from the battery pack 46, supplies information about the remaining capacity and deterioration of the battery to the host equipment and also transfers power from the host equipment to the battery pack 40.

The battery management unit 50 according to the second embodiment of a present invention includes a charge/discharge unit 52 and the controller 54. The charge/discharge unit 52 provides a path of charge/discharge current between the host equipment and the battery group 40 and then outputs a voltage from the battery group 40 and a charge/discharge current. The controller 54, after receiving a voltage from the battery group 40 and a charge/discharge current from the charge/discharge unit 52 and the basic information about the battery group 40 from the thermistor 42, detects the remaining capacity and deterioration of the battery group 40 to transfer this information to the host equipment, so that the controller 34 controls the charge/discharge unit 52.

The operation of the intelligent battery device according to the second embodiment is described as follows.

The memory unit 44 loads in advance the basic information about the battery group 40 such as a charge cutoff method and data(-ΔV, dT/dt, MAX temperature and so forth), batteries capacity and the number of battery, peak voltage condition and safe timer data, and charge operation temperature range.

The information that the memory unit 44 loads is transferred to the controller 54, and the controller 54 controls the operation of the battery management unit 50 on the basis of the above-identified information.

Power charged in the battery group 40 is supplied to the host equipment through the charge/discharge unit 52 formed within the battery management unit 50 and the host equipment operates by this power.

At this point, the charge/discharge unit 52, after detecting the voltage or current from the battery group 40, transfers information about the voltage or current to the controller 54. The controller 54, after detecting the remaining capacity of the battery group 40 on the basis of the information from the memory unit 44 and the voltage and current from the battery group, transfers the detected information to the host equipment.

Also, the thermistor 42, after detecting the temperature of the battery group 40, transfers the information to the controller 54. The controller 54, after detecting information about the deterioration of the battery group 20 on the basis of the temperature and the information from the memory unit 44, transfers this information to the host equipment.

If the remaining capacity of the battery group 40 is low, the battery group 40 is charged by the power supplied through the charge/discharge unit 52 from the host equipment.

And, the controller 54 receives a current or voltage from the charge/discharge unit 52 to thereby control the above-identified charge process.

Here, the battery management unit 50 and the battery pack 46 are separately formed within the host equipment, to thereby avoid malfunction of the battery management unit 50 and the damage of the circuit substrate when a battery leaks liquid from the inner part and is overheates due to a hot and humid climate.

However, because the user can replace only the battery pack 40 without touching the battery management unit 50, the battery management unit 50 can be used semi-permanently, to thereby reduce the burden of the user.

Figure 7:
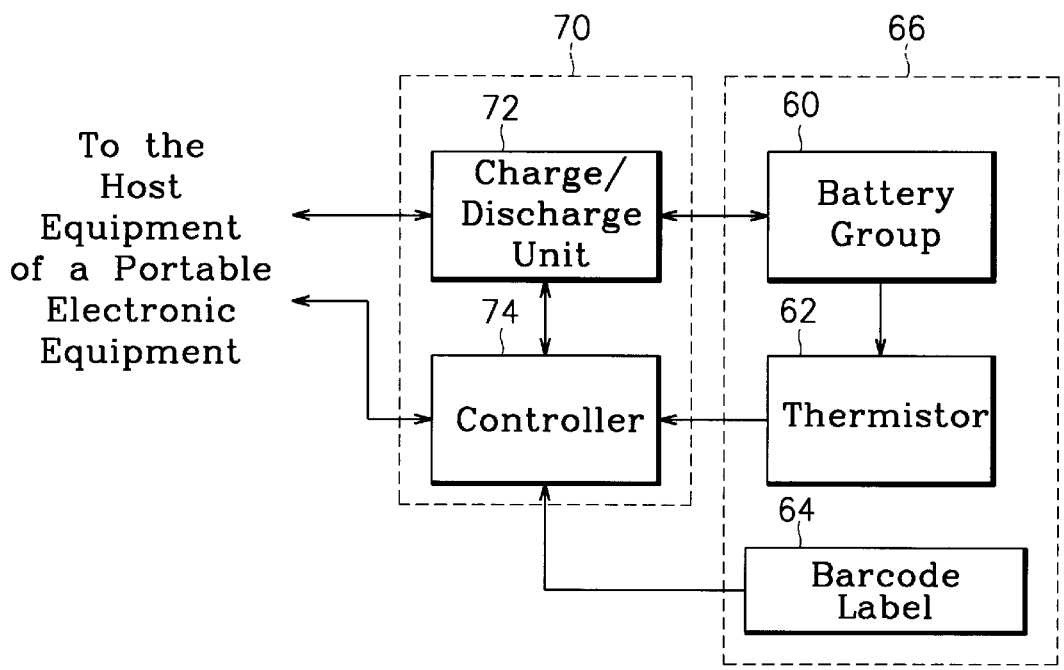
FIG. 7 is a block diagram illustrating an intelligent battery device according to the third embodiment of the present invention.

FIG. 7 is a block diagram illustrating the intelligent battery device according to the third embodiment of the present invention.

As shown in FIG. 7, the intelligent battery device according to the third embodiment of the present invention comprises a battery pack 66 and battery management unit 70. The battery pack 66 includes battery group 60 which is chargeable and dischargeable, a thermistor 42 which measures the temperature of the battery group 60 to output the result, and a barcode label 64 which loads basic information about the battery group 60. The battery management unit 70 between the battery pack 66 and the portable equipment device, after receiving power and a temperature signal and the basic information about the battery group 60 from the battery pack 66, supplies power and the information about the remaining capacity and deterioration of the battery to the host equipment and then transfers power from the host equipment to the battery pack 66.

The battery management unit 70 according to the third embodiment of a present invention includes the charge/discharge unit 72 and the controller 74. The charge/discharge unit 72 provides a path of charge/discharge current between the host equipment and the battery group 60 and also outputs a voltage of the battery group 60 and a charge/discharge current. The controller 74, after receiving voltage from the battery group 60, a charge/discharge current from the charge/discharge unit 72, temperature of the battery group 60 from the thermistor 62, the basic information about the battery group 60 from the thermistor 62, the barcode label 64, detects the remaining capacity and deterioration of the battery group 60 to transfer this information to the host equipment, to thereby control the charge/discharge unit 72.

The operation of the intelligent battery device according to the third embodiment is described as follows.

The barcode label 64 represents the basic information about the battery group 60 such as a charge cutoff method and data(-ΔV, dT/dt, MAX temperature and so on), batteries capacity and the number of battery, peak voltage condition and safe timer data, and charge operation temperature range.

Figure 8:
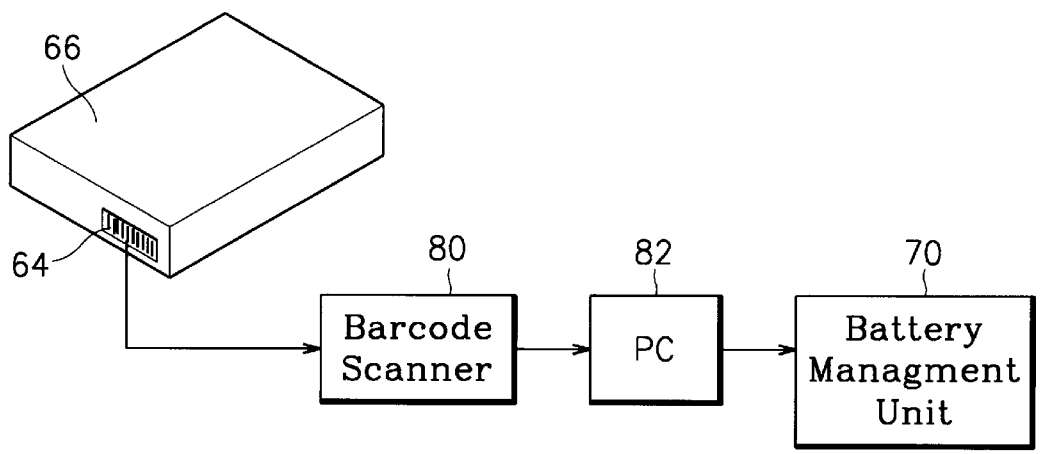
FIG. 8 is a schematic diagram illustrating an intelligent battery device reading a barcode label according to the third embodiment of the present invention and transferring this information to a controller.

The barcode label 64 having the above-identified information is disposed on the battery pack 66 and the barcode scanner 80, shown in FIG. 8, reads the information.

The information read by the barcode scanner 80 is transferred through the personal computer 82 to the battery management unit 70.

The controller 74 within the battery management unit 70 receives the information represented on the barcode label 64 and then controls the operation of the battery management unit 70 on the basis of the above identified information.

Power charged in the battery group 60 is supplied to the host equipment through the charge/discharge unit 72 formed within the battery management unit 70 and the host equipment operates by this power.

At this point, the charge/discharge unit 72, after detecting the voltage or current from the battery group 60, transfers the detecting information to the controller 74, and the controller 74, after detecting the remaining capacity of the battery group 60 on the basis of voltage and current from the battery group 60 and the information from the barcode label 64, transfers the detected information to the host equipment.

Also, the thermistor 62, after detecting the temperature of the battery group 60, transfers the information to the controller 74, and the controller 74, after detecting information about the deterioration of the battery group 60 on the basis of this temperature and the information from the barcode label 64, transfers this information to the host equipment.

If the remaining capacity of the battery group 60 is low, the battery group 60 is charged by the power supplied through the charge/discharge unit 72 from the host equipment.

And, the controller 74 receives a current or voltage from the charge/discharge unit 72, to thereby control the above-identified charge process.

Here, the battery management unit 70 and the battery pack 66 are separately formed within the host equipment, to thereby prevent malfunction of the battery management unit 70 and damage to the circuit substrate which can be generated by the leakage of liquid and overheating of the battery group 60 in a hot and humid climate.

However, because the user can replace only the battery pack 60 without touching the battery management unit 70, the battery management unit 70 can be used semi-permanently, to thereby reduce the burden of the user.

As described in the above embodiments, the battery management unit and the battery pack are separately formed within the host equipment, to thereby prevent malfunction of the battery management unit and the damage to the circuit substrate which can be generated by the leakage of liquid and overheating of the battery group in a hot and humid climate. However, because the user can replace only the battery pack without touching the battery management unit, the battery management unit can be used semipermanently, to thereby reduce the burden of the user.

Having described and illustrated the principles of the invention in a preferred embodiment thereof, it should be apparent by those skilled in the art that modifications and variations may be made without departing form the spirit and scope of the present invention.

What is claimed:

1. An intelligent battery device, comprising:
    a battery pack having a battery group which is chargeable and dischargeable, a thermistor for measuring the temperature of the battery group and outputting the results and a memory unit for loading information about the battery group; and
    a battery management unit having a charge/discharge unit which provides a current charge/discharge path between host equipment and the battery group, said charged/discharge unit outputting voltage from the battery group and a charge/discharge current, and a controller for detecting remaining capacity of the battery group in response to the voltage and the charge/discharge current from the charge/discharge unit the temperature of the battery group from the thermistor, and the information about the battery group from the memory unit, said controller transferring information relating to the remaining capacity of the battery group to the host equipment, and controlling the charge/discharge unit in accordance with said information.

2. An intelligent battery device according to claim 1 information about the battery group comprises charge cutoff data, battery capacity and number of batteries, peak voltage condition and safe timer data, and charge operation temperature range.

3. An intelligent battery device according to claim 1 wherein the memory unit is non-erasable and can be read electrically.

4. An intelligent battery device according to claim 1 wherein the memory unit includes a barcode label disposed on the battery pack, said barcode label having a barcode.

5. An intelligent battery device according to claim 4 wherein the barcode label comprises the information about the battery group and the information is adapted to be read by a barcode scanner and transferred through a personal computer to the controller.

* * * * *